United States Patent [19]
Christensen et al.

[11] 3,878,203
[45] Apr. 15, 1975

[54] METHOD FOR THE PREPARATION OF CEPHALOSPORIN DERIVATIVES

[75] Inventors: Burton G. Christensen, Scotch Plains; Raymond A. Firestone, Fanwood, both of N.J.

[73] Assignee: Merck & Co., Inc., Rahway, N.J.

[22] Filed: Dec. 16, 1971

[21] Appl. No.: 208,939

[52] U.S. Cl. .............................. 260/243 C; 424/246
[51] Int. Cl. .............................................. C07d 99/24
[58] Field of Search .................................. 260/243 C

[56] References Cited
UNITED STATES PATENTS

| | | | |
|---|---|---|---|
| 3,544,581 | 12/1970 | Essery | 260/243 C |
| 3,597,421 | 8/1971 | Webber | 260/243 C |
| 3,709,880 | 1/1973 | Gaegelman et al. | 260/243 C |
| 3,716,533 | 2/1973 | Humber et al. | 260/243 C |

OTHER PUBLICATIONS
Nagarajan et al., JACS, Vol. 93:9, pp. 2,308–2,312, May 5, 1971.

*Primary Examiner*—Nicholas S. Rizzo
*Attorney, Agent, or Firm*—Hesna J. Pfeiffer; J. Jerome Behan

[57] ABSTRACT

A method for the preparation of 3-carbamoyloxymethyl-7-methoxy-7-(2-[2-thienyl]acetamido)decephalosporanic acid and its salt and ester derivatives, which comprises treating a 3-carbamoyloxymethyl-7-methoxy-7-(halo or metallo-substituted lower alkanamido)decephalosporanate with a 2-thienyl halide or metallide or with a 2-thenyl halide or metallide. The decephalosporanic acid product thus obtained and its salts are antibiotics which have utility against gram-positive and gram-negative bacteria.

4 Claims, No Drawings

METHOD FOR THE PREPARATION OF CEPHALOSPORIN DERIVATIVES

This invention relates to a novel method for the preparation of 3-carbamoyloxymethyl-7-methoxy-7-(2-[2-thienyl]acetamido) decephalosporanic acid and its salt and ester derivatives.

The products of this process and their salts are antibiotics which have activity against various gram-positive and gram-negative bacteria. Although, their biological spectrums are similar to those of known cephalosporins they demonstrate a surprising effectiveness against certain microorganisms and an unexpected resistance to certain enzymes. Thus, for example, they are active against many microorganisms which are resistant to the β-lactamase produced by cephalosporin-resistant clinical isolates of such pathogens as *E. coli* and *A. cloacae*. Also, they are generally more active against strains of *Proteus* such as *mirabilis* and are active against strains of *Proteus morganii* which are resistant to the unsubstituted cephalosporins. For these reasons they are useful in removing susceptible microorganisms from pharmaceutical, medical and dental equipment and as bactericides in industrial applications as, for example, in water-based paints and in the white water of paper mills to inhibit the growth of harmful bacteria.

According to this invention the product 3-carbamoyloxymethyl-7-methoxy-7-(2-[2-thienyl]acetamido)decephalosporanate acid and its salts and esters (I, infra) are obtained by treating a 3-carbamoyloxymethyl-7-methoxy-7-(halo or metallo-substituted lower alkanamido) decephalosporanate (II, infra) with the appropriate (1) 2-thienyl halide or metallide or with a (2) 2-thienyl halide or metallide:

or lithium cation; R is hydrogen or an alkali metal cation such as the sodium, potassium or lithium cation with the proviso that when $X^1$ is halo R is hydrogen; $R^1$ is the cation derived from an alkali metal such as sodium, potassium or lithium cation or a blocking group, for example, lower alkyl such as methyl, ethyl, n-propyl or tertiary-butyl, lower alkoxy alkyl such as methoxy methyl, tri-lower alkylsilyl such as trimethylsilyl, polyhalo lower alkyl such as trichloroethyl, lower alkenyl such as allyl or propenyl, lower alkynyl such as propargyl, aryl for example, mononuclear aryl such as phenyl, aralkyl such as mononuclear aralkyl wherein the benzene ring may be substituted by one or more radicals selected from nitro and lower alkoxy as, for example, benzyl, 2-nitrobenzyl, 3,5-di-nitrobenzyl or 4-methoxybenzyl, diaralkyl, for example, mononuclear diaralkyl such as benzhydryl, arylcarbonylmethyl such as phenacyl, lower alkanoyloxymethyl such as acetoxymethyl or pivaloyloxymethyl; and $m$ and $n$ are integers having a total value of one.

The choice of a suitable solvent is not critical to the reaction but, in practice, it is usually desirable to employ a substantially inert medium such as tetrahydrofuran or dimethylformamide. The reactants are combined at low temperatures in the range of from about −78° to 25°C. but preferably at temperatures of from about −20° to 0°C. The reaction mixture is then permitted to warm to room temperature and the resulting product is isolated by conventional means to afford a crystalline product (I).

A preferred embodiment of this invention consists in treating a 2-thienyl metallide such as the lithium or sodium derivative with a 3-carbamoyloxymethyl-7-

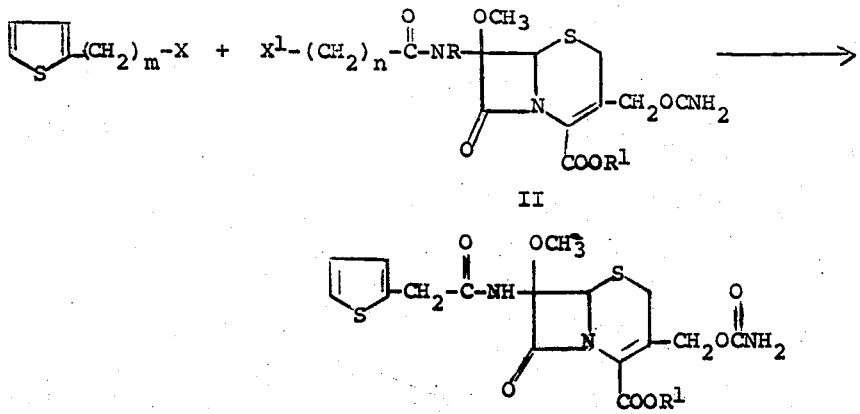

wherein X and $X^1$ are different members selected from halo- such as chloro, bormo, fluoro or iodo and the like or an alkali metal cation such as the sodium, potassium methoxy-7-(2-haloacetamido)decephalosporanate (IIa, infra) at a temperature of from about −50°C. to about −80°C.:

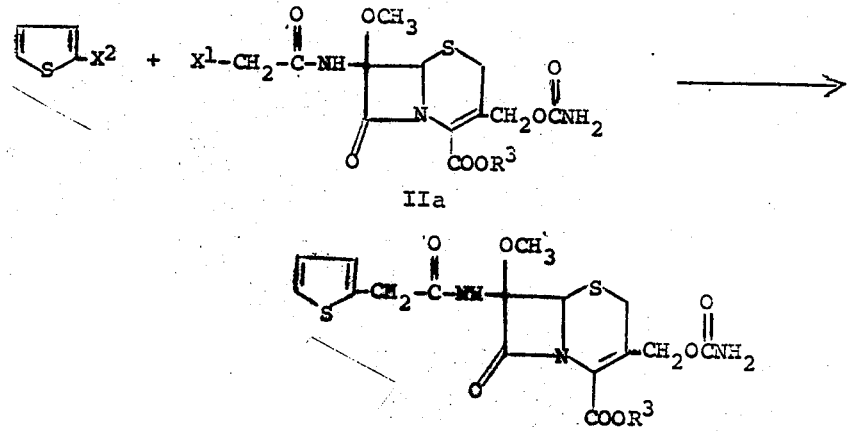

wherein $X^2$ is the cation derived from lithium or sodium, $X^1$ is halo such as chloro, bromo, fluoro or iodo and $R^3$ is one of the blocking groups within the definition of $R^1$ but, preferably benzyl or benzhydryl. This method of preparation is particularly suitable for preparing the instant 7-methoxy-7-(2-thienylacetamido)-cephalosporanate products.

Another aspect of this invention consists in treating a 3-carbamoyloxymethyl-7-methoxy-7-(N-metallo-N-[2-metalloacetyl])amino decephalosporanate with a 2-thienyl halide. According to this method the 4-carboxy moiety in the starting material (IIb, infra) may either be esterified or may be in the form of its alkali metal salt. The following equation illustrates this method of preparation:

largely upon the character of the group $X^1$ in the alkanamido portion of the molecule. For example, the 3-carbamoyloxymethyl-7-methoxy-7-(halo-alkanamido)decephalosporanates corresponding of Formula II, supra, wherein $X^1$ is halo and n is zero are conveniently obtained by treating an ester of 3-carbamoyloxymethyl-7-methoxy-7-amino decephalosporanic acid (III, infra) with a suitable acylating agent such as phosgene, in the presence of a base such as pyridine, at temperatures in the range of from about 0° to −40°C. The following equation illustrates this method of preparation:

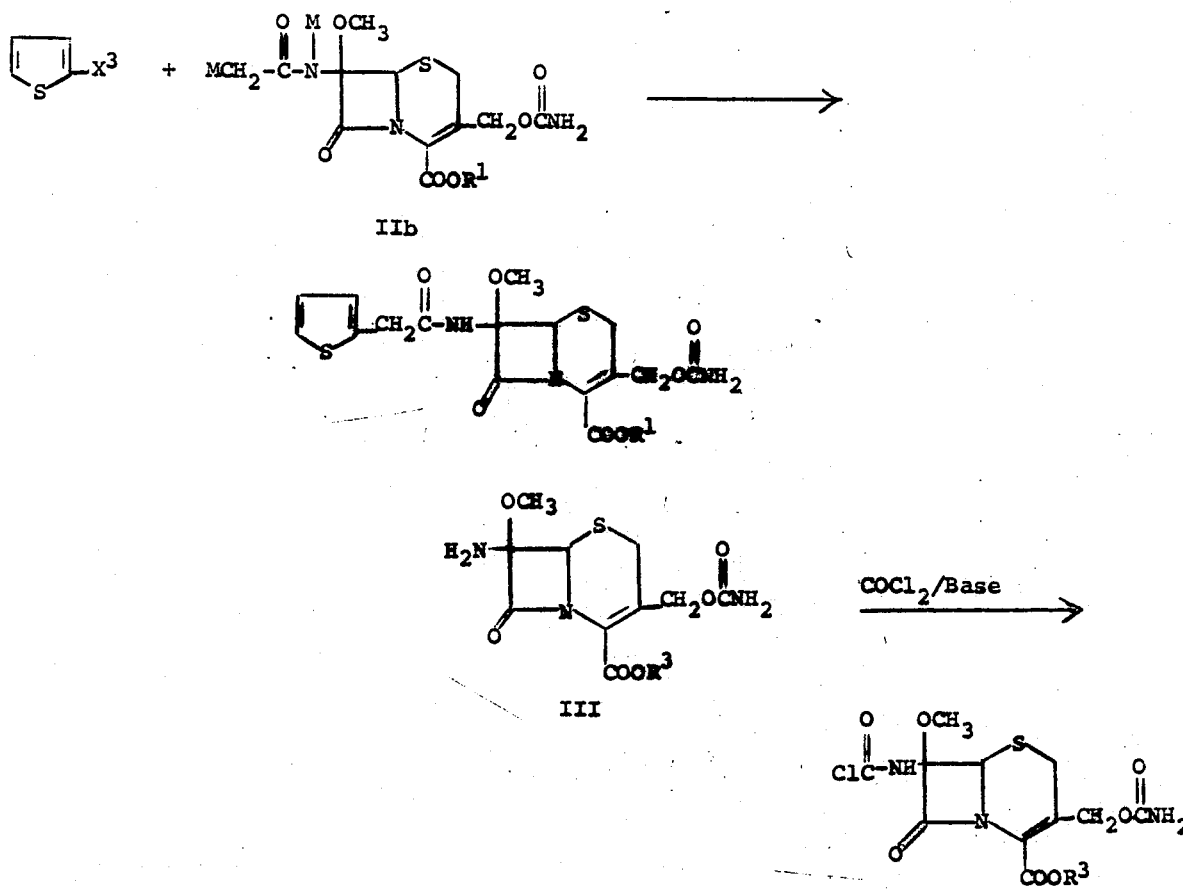

wherein M is an alkali metal cation such as the cation derived from sodium, potassium or lithium and the like; $X^3$ is halo and $R^1$ is as defined above but, preferably, an alkali metal cation or a benzyl or benzhydryl blocking group. When $R^1$ is an alkali metal cation the resulting product can be converted to its free acid by treatment with an acid such as an aqueous solution of a mineral acid.

The cephalosporin starting materials (II) of this process are prepared by several methods, depending wherein $R^3$ is as defined above.

In the preceding method the halo moiety at position 7 is bonded directly to the carbonyl carbon. Alternatively, those starting materials wherein the halo moiety is separated from the carbonyl carbon by a methylene bridge, can be obtained by simply treating an ester of 3-carbamoyloxymethyl-7-methoxy-7-amino decephalosporanic acid (III) with an haloacetyl halide in the presence of a base. This reaction is preferably conducted at low temperatures of about 0°C.:

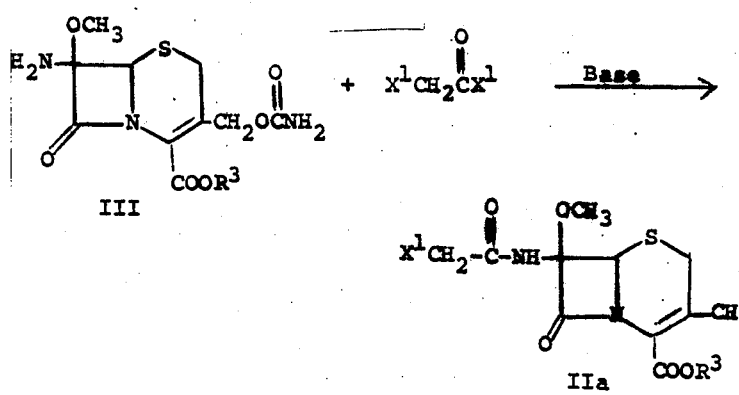

wherein $R^3$ and $X^1$ are as defined above.

Those cephalosporin reactants corresponding to Formula II, supra, wherein R and $X^1$ are alkali metal cations are also derived from esters of 3-carbamoyloxymethyl-7-methoxy-7-amino decephalosporanic acid (III). According to this procedure the 3-carbamoyloxymethyl-7-methoxy-7-amino cephalosporanate (III) is first acetylated via treatment with acetic anhydride in the presence of a base and the resulting 3-carbamoyloxymethyl-7-methoxy-7-acetamidodecephalosporanate (IV) is then treated with two equivalents of an alkali metal dialkyl amide such as lithium diisopropyl amide, to afford the desired 3-carbamoyloxymethyl-7-methoxy-7-(N-metallo-N-[2-metalloacetyl])amino decephalosporanate (V): The following equation illustrates this method of preparation:

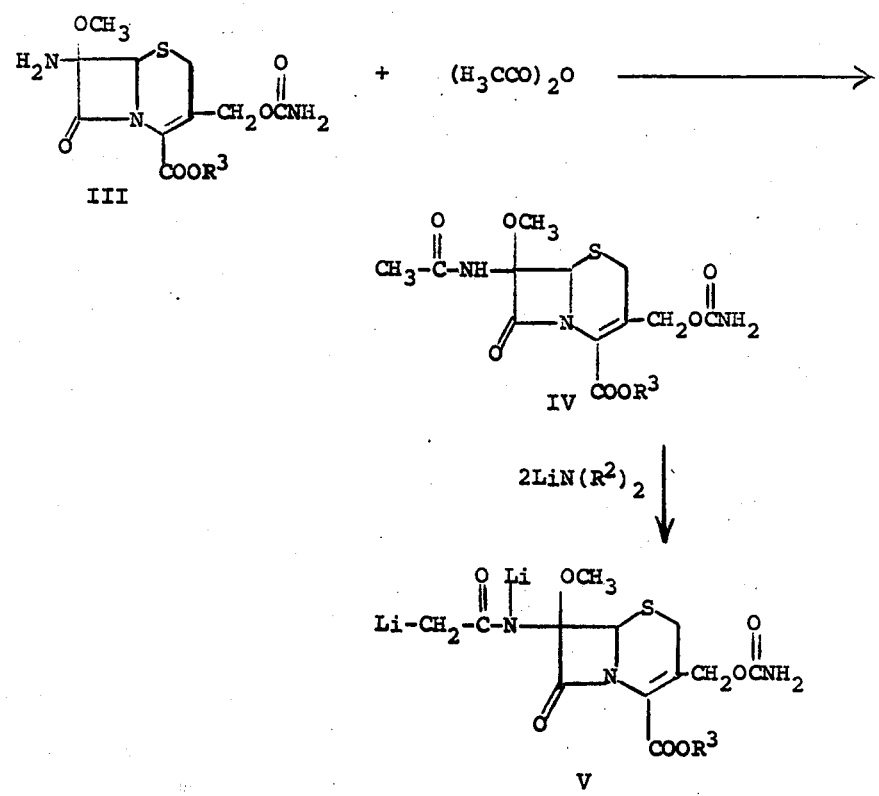

$R^1$ and $X^1$ each represent an alkali metal cation are wherein $R^2$ is lower alkyl such as methyl, ethyl, n-propyl or diisopropyl and $R^3$ is as defined above.

According to still another method of preparation of those cephalosporin starting materials (II) wherein R, conveniently obtained by converting the 3-carbamoyloxymethyl-7-methoxy-7-acetamido decephalosporanate (IV) to the corresponding free acid by conventional means followed by treatment with three equivalents of an alkali metal di-lower alkyl amide such as lithium diisopropyl amide:

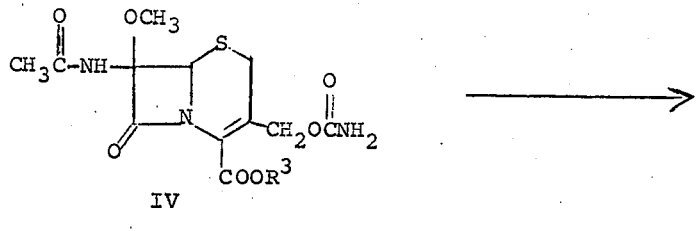

Continued

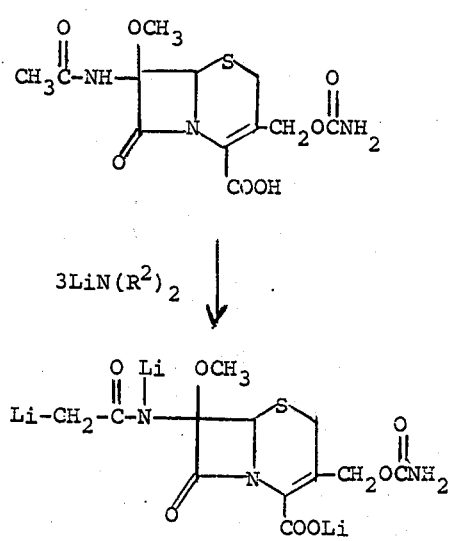

wherein R² and R³ are as defined above.

The ester products (I) of this invention are converted to the corresponding free acid and its salts by methods which are well-known to those skilled in the art. The benzyl ester, for example, is converted to its free acid by catalytic hydrogenation and subsequent acidification. The benzhydryl ester, on the other hand, may be converted to the corresponding free acid by treatment with trifluoroacetic acid in anisoles.

The salts of the carboxylic acid product are obtained by conventional means. The mono-salts such as the mono-sodium salt is obtained by treating one equivalent of sodium hydroxide with one equivalent of 3-carbamoyloxymethyl-7-methoxy-7-(2-thienylacetamido)decephalosporanic acid. And, too, said salts may be used to prepare other pharmaceutically acceptable salts.

The examples which follow illustrate the process of this invention. However, the examples are illustrative only and it should be apparent to those skilled in the art that this invention includes other functionally equivalent products and methods for their preparation. Therefore, any modification of this synthesis which results in the formation of an identical product should be construed as constituting an analogous method. The claimed process is capable of wide variation and modification and any minor departure therefrom or extension thereof is considered as being within the skill of the artisan and as falling within the scope of this invention.

EXAMPLE 1

Benzhydryl 3-carbamoyloxymethyl-7-methoxy-7-(2-[2-thienyl]-acetamido)decephalosporanate Step A Benzhydryl 3-carbamoyloxymethyl-7-methoxy-7-(2-chloroacetamido)decephalosporanate Benzhydryl 3-carbamoyloxymethyl-7-methoxy-7-amino decephalosporanate (469 mg.) in methylene chloride (15 ml.) is treated for 15 minutes at 0°C. with chloroacetyl chloride (113 mg.) and pyridine (0.2 ml.). The solution is then washed successively with an aqueous pH 2 phosphate buffer, water, and an aqueous pH 8 phosphate buffer. After drying with magnesium sulfate and filtration and evaporation of the solvent, the product benzhydryl 3-carbamoyloxymethyl-7-methoxy-7-(2-chloroacetamido)decephalosporanate is obtained.

Step B

Benzhydryl 3-carbamoyloxymethyl-7-methoxy-7-(2-[2-thienyl]acetamido)decephalosporanate The benzhydryl 3-carbamoyloxymethyl-7-methoxy-7-(2-chloroacetamido)decephalosporanate obtained in Step A is treated with 2-thienyllithium (1 m. mole) in tetrahydrofuran (15 ml.) at −78°C. under nitrogen. The reaction mixture is allowed to warm up to room temperature over ½ hour, diluted with benzene (50 ml.) and washed twice with water. The resulting mixture is then dried with magnesium sulfate, filtered and evaporated to afford benzhydryl 3-carbamoyloxymethyl-7-methoxy-7-(2-[2-thienyl]acetamido)decephalosporanate. This product is characterized by thin layer chromatography (7 percent methanol in 1:1 chloroform: n-hexane) as a single spot. It is also characterized by the followinng

IR ($CHCl_3$) 1740, 1800 cm$^{-1}$;

UV $\lambda$max. 263$\mu$m $\epsilon$5800

NMR (Solvent: $CDCl_3$) $\delta$=3.45 (—$OCH_3$, s), ~3.4 (2–$H_2$, d), 5.02 (6–H, s), ~4.92 (10–$H_2$, partially visible), 3.85 (13–$H_2$, s).

EXAMPLE 2

Benzhydryl 3-carbamoyloxymethyl-7-methoxy-7-(2[2-thienyl]acetamido decephalosporanate Step A Benzhydryl 3-carbamoyloxymethyl-7-methoxy-7-chlorocarbonylamino decephalosporanate Benzhydryl 3-carbamoyloxymethyl-7-methoxy-7-aminodecephalosporanate (469 mg.) is treated with phosgene (99 mg.) at −20°C. in methylene chloride (20 ml.) containing pyridine (79 mg.). The reaction mixture is warmed to 0°C. and then pumped under high vacuum at 0°C. to remove the solvent. The residue is then taken up in cold benzene (15 ml.) and filtered to remove pyridine hydrochloride. The resulting product is identified as benzhydryl 3-carbamoyloxymethyl-7-methoxy-7-(chlorocarbonylamino)decephalosporanate.

Step B

Benzhydryl 3-carbamoyloxymethyl-7-methoxy-7-(2[2-thienyl]acetamido)decephalosporanate The solution of benzhydryl 3-carbamoyloxymethyl-7-methoxy-7-(chlorocarbonylamino)decephalosporanate obtained in Step A is evaporated in vacuo at 0°C. and taken up in tetrahydrofuran (10 ml.). A solution of 2-thenyllithium (1 m. mole) in tetrahydrofuran (10 ml.) is added under nitrogen at −78°C. followed by the addition of dimethylformamide (20 ml.). (The compound 2-thenyllithium is prepared from 2-methylthiophene by treatment with an equimolar amount of n-butyllithium in tetrahydrofuran at −15°C.) The reaction mixture is stirred for 1 minute at −78°C. and then allowed to warm to room temperature over 30 minutes. Benzene (100 ml.) is added and the solution is washed 6 times with water; the second wash is acidified to pH 2, and the fifth wash is buffered to pH 8. After drying with magnesium sulfate and filtration and evaporation of the solvent, the product benzhydryl 3-carbamoyloxymethyl-7-methoxy-7-(2-[2-thienyl]acetamido)decephalosporanate is obtained. The product is characterized by the following data:

IR
(CHCl$_3$) 1740, 1800 cm$^{-1}$;
UV
λmax. 263μm ε5800
NMR (Solvent: CDCl$_3$) δ=3.45 (—OCH$_3$, s), ~3.4 (2-H$_2$, d), 5.02 (6-H, s), ~4.92 (10-H$_2$, partially visible), 3.85 (13-H$_2$, s).

EXAMPLE 3

Benzhydryl 3-carbamoyloxymethyl-7-methoxy-7-(2-[thienyl]acetamido)decephalosporanate Step A
Benzhydryl 3-carbamoyloxymethyl-7-methoxy-7-acetamidodecephalosporanate Benzhydryl 3-carbamoyloxymethyl-7-methoxy-7-aminodecephalosporanate (469 mg.) is treated with acetic anhydride (102 mg.) at 0°C. for 15 minutes in methylene chloride (20 ml.) containing pyridine (79 mg.). The solution is washed successively with aqueous pH 2 buffer, water, and aqueous pH 8 buffer and then dried with magnesium sulfate, filtered and evaporated to afford benzhydryl 3-carbamoyloxymethyl-7-methoxy-7-acetamidodecephalosporanate.

Step B
Benzhydryl 3-carbamoyloxymethyl-7-methoxy-7-(N-lithio-N-[2-lithioacetyl])amino decephalosporanate The benzhydryl 3-carbamoyloxymethyl-7-methoxy-7-acetamidodecephalosporanate prepared in Step A, is taken up in a 1:5 mixture of tetrahydrofuran-hexane and treated at 0°C. with lithium diisopropylamide (2 m. mole) in the same solvent (total volume 40 ml.). The resulting product in solution is benzhydryl 3-carbamoyloxymethyl-7-methoxy-7-(N-lithio-N-[2-lithioacetyl])amino decephalosporanate, as a solution.

Step C
Benzhydryl 3-carbamoyloxymethyl-7-methoxy-7-(2-[2-thienyl]acetamido)decephalosporanate To the solution of benzhydryl 3-carbamoyloxymethyl-7-methoxy-7-(N-lithio-N-[2-lithioacetyl]) amino decephalosporanate obtained in Step B is added 2-chlorothiophene (116 mg.) and the solution is then stirred 1 hour at room temperature. Acetic acid (60 mg.) is added and the solvent evaporated in vacuo. Benzene (25 ml.) is added to the residue and the solution is washed successively with aqueous pH 2 buffer, water and an aqueous pH 8 buffer. After drying with magnesium sulfate and filtration and evaporation of the solvent, the compound benzhydryl 3-carbamoyloxymethyl-7-methoxy-7-(2-[2-thienyl]acetamido) decephalosporanate is obtained. The product is characterized by the following data:

IR
(CHCl$_3$) 1740, 1800 cm$^{-1}$;
UV
λmax. 263μm ε5800
NMR
(Solvent: CDCl$_3$) =3.45 (—OCH$_3$, s), ~3.4 (2-H$_2$, d), 5.02 (6-H, s), ~4.92 (10-H$_2$, partially visible), 3.85 (13-H$_2$, s).

EXAMPLE 4

3-Carbamoyloxymethyl-7-methoxy-7-(2-[2-thienyl]acetamido)decephalospopranic acid Step A
3-Carbamoyloxymethyl-7-methoxy-7-acetamido decephalosporanic acid Benzhydryl 3-carbamoyloxymethyl-7-methoxy-7-acetamidodecephalosporanate (511 mg.) is dissolved in anisole (1 ml.) at 0°C. Trifluoroacetic acid (5 ml.) is added with stirring at 0°C. After 2 minutes high vacuum is applied, removing excess trifluoroacetic acid in the cold, and anisole at 30°C. Another portion of anisole (2 ml.) is added and then removed in vacuo at 30°C. The product 3-carbamoyloxymethyl-7-methoxy-7-acetamido decephalosporanic acid thus obtained, is purified by dissolving in water at pH 8, washing twice with methylene chloride, acidifying to pH 2 and extracting the product into ethyl acetate. The ethyl acetate solution is then dried with magnesium sulfate, filtered and evaporated to afford pure 3-carbamoyloxymethyl-7-methoxy-7-acetamido decephalosporanic acid.

Step B
Lithium 3-carbamoyloxymethyl-7-methoxy-7-(N-lithio-N-[2-lithioacetyl])amino decephalosporanate The 3-carbamoyloxymethyl-7-methoxy-7-acetamido decephalosporanic acid obtained in Step A is taken up in tetrahydrofuran and treated with 3 m. moles of lithium diisopropylamide at 0°C. according to the procedure described in Example 3, Step B. There is thus obtained lithium 3-carbamoyloxymethyl-7-methoxy-7-(N-lithio-N-[2-lithioacetyl])-amino decephalosporanate which is used directly in the next step.

Step C
3-Carbamoyloxymethyl-7-methoxy-7-(2-[2-thienyl]acetamido)decephalosporanic acid To the solution of lithium 3-carbamoyloxymethyl-7-methoxy-7-(N-lithio-N-[2-lithioacetyl])amino decephalosporanate in Step B is added 2-chlorothiophene (116 mg.) and after 1 hour's stirring at room temperature, pyridine hydrochloride (231 mg.) is added. The product is extracted into aqueous pH 7 buffer, washed with methylene chloride twice, acidified to pH 2 and extracted into ethyl acetate. After drying with magnesium sulfate and filtration and evaporation of the solvent there is thus obtained 3-carbamoyloxymethyl-7-methoxy-7-(2-[2-thienyl]acetamido)decephalosporanic acid, m.p. 165°–167°C.

What is claimed is:

1. The method wherein a 2-thienyl metallide is reacted with a compound of the formula:

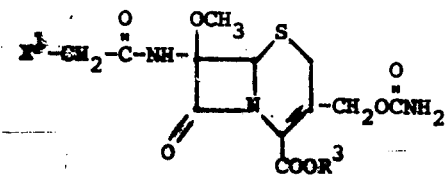

wherein R$^3$ is lower alkyl, lower alkoxy alkyl, tri-lower-alkylsilyl, polyhalo lower alkyl wherein polyhalo indicates 2-3 halogen substituents, lower alkenyl, lower alkynyl, phenyl, benzyl, wherein the benzene ring is unsubstituted or may be substituted by one or more nitro or lower alkoxy moieties, benzhydryl, phenacyl, lower alkanoyloxymethyl or pivaloyloxymethyl; and $X^1$ is halo.

2. The method of claim 1 wherein the metallide is derived from an alkali metal.

3. The method of claim 1 wherein 2-thienyllithium is reacted with benzhydryl 3-carbamoyloxymethyl-7-methoxy-7-(2-chloroacetamido)decephalosporanate to afford benzhydryl 3-carbamoyloxymethyl-7-methoxy-7-(2-[2-thienyl]acetamido)decephalosporanate.

4. The method wherein 2-thenyllithium is reacted with benzhydryl 3-carbamoyloxymethyl-7-methoxy-7-(chlorocarbonylamino)decephalosporanate to afford benzhydryl 3-carbamoyloxymethyl-7-methoxy-7-(2-[2-thienyl]acetamido)decephalosporanate.

* * * * *